Feb. 22, 1949.                     G. T. DAVISSON                     2,462,169
                INHALER FOR TREATING SINUS AND HAY FEVER AND
                   METHOD OF SEALING A MEDICAMENT THEREIN.
                            Filed April 30, 1945.
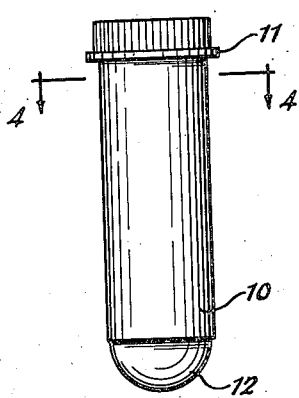
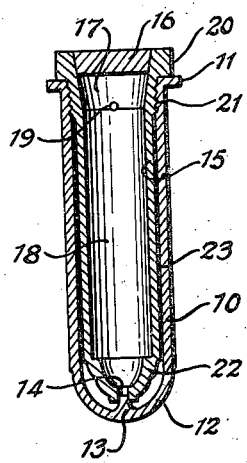
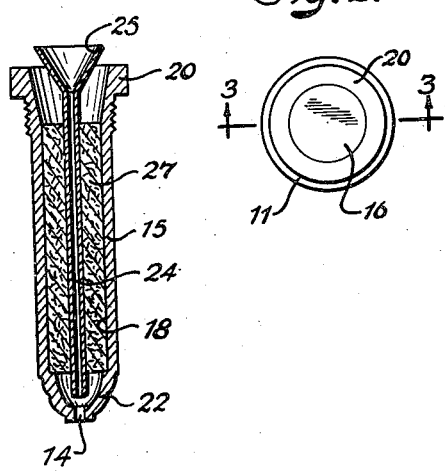
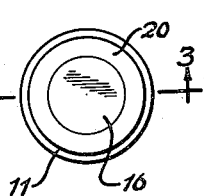
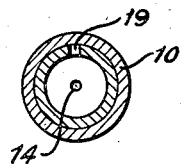
Inventor
Glen Teeple Davisson.
By  Clarence A. O'Brien
    and Harvey B. Jacobson
                          Attorneys Patented Feb. 22, 1949

2,462,169

UNITED STATES PATENT OFFICE 2,462,169

INHALER FOR TREATING SINUS AND HAY FEVER AND METHOD OF SEALING A MEDICAMENT THEREIN

Glen Teeple Davisson, El Paso, Tex.

Application April 30, 1945, Serial No. 591,152

7 Claims. (Cl. 128—200)

My invention relates to manner and means for treating hay fever, sinus trouble and similar bodily ills. The apparatus used consists of a tubular vessel or inhaler made of any unbreakable material, preferably a plastic, and of suitable size for carrying in the pocket ready for immediate use and the invention further relates to the method of injecting and sealing a medicament in said inhaler.

This inhaler is intended when filled with the medicine to be applied to the nostrils of the nose for inhaling the fumes from the evaporating medicine which will take immediate effect on the inflamed parts of the nostrils and the passages therefrom.

One of the main objects of this invention is the particular manner by which the inhaler is loaded or, in other words, the method of injecting the medicament for evaporation in powder form in the inhaler proper or inner container provided with a filter and then closing the same to prevent the powder particles escaping therefrom when not in actual use.

The powder is filtered through the lamb's wool, and when inhaler is used, all of these little particles release a small portion of gas, which makes sufficient amount of gas for effective inhalation; whereas, if it were in there solidily, only the top would release a very small amount of gas and no air would be able to come up from the vents at the base of the inhaler.

This and other features will be clear from reading the following description of the invention with the aid of the accompanying drawing wherein Figure 1 is an exterior view or side elevation of the inhaler;

Figure 2 is a plan view of Figure 1;

Figure 3 is an axial section along line 3—3 of Figure 2;

Figure 4 is a transverse section along line 4—4 of Figure 1; and

Figure 5 is an axial section similar to Figure 3 showing the manner of injecting the medicament in the inner container.

The medicament used is sodium hypochlorite which contains approximately 2 grams of hypochlorite with 70% available chlorine, or other similar purifying chlorine mixture which liberates the chlorine gas. By the use of a funnel top glass tube around which is wound tightly fine lamb's wool to fill the space in the container, this tube filled with powder is pushed into said container, whereupon the wool so inserted is filled with the medicament as much as it can hold, when the glass tube is withdrawn, the open end of the container is corked and screwed down in the outer casing as far as it will go to close the inhaling aperture at the apex of the container. No powder can then exude therefrom.

In the drawing the same numerals indicate the same details in the different figures.

An outer cylindrical casing is denoted by numeral 10. A narrow surrounding flange 11 is supplied at its open end, while its closed end, Figures 1 and 3, terminates with a semi-spherical portion 12. Its exterior is here indicated smooth-faced, but may be rifled. The walls are of uniform thickness and smooth-faced inside, while at the exact center of its spherical end is shown a small wart, teat or inwardly extending central tapered projection 13 which forms a closure for the narrow aperture 14 at the apex of the inhaler proper 15 or inner container for the medicine.

At the filler end of the container 15 is provided a plug 16 fitting tightly in the slightly tapered portion 17 of the otherwise cylindrical chamber 18 of the container 15, and two or more air vents 19 are indicated through its wall at the tapered portion. The filler end of the container 15 has a knurled head 20 with a shoulder abutting against the casing flange 11 when the container is screwed in tight in the casing 10, by means of the threads 21 just under the head 20. The inhaler end of the container tapers gradually as at 22 from the cylindrical chamber 18 to the inhaler aperture 14. In order to permit easy assembling of the container 15 in the casing 10 a narrow space is provided between their adjacent surfaces as at 23.

In Figure 5 is indicated the method of injecting the medicament in powder or liquid form in the container 15. This is done by the use of a narrow tube 24 of the glass, porcelain, metal or plastic material and long enough to reach to the bottom of the container while its funnel-shaped top 25 remains outside.

By holding the tube 24 in the hand the dry absorption material, preferably soft lamb's wool 27, is wrapped tightly around the tube 24 sufficiently thick to fill the chamber 18. Wrapped in this manner the tube with the wool is pushed into the chamber 18, and filled with powder or liquid. This done, the tube is withdrawn from the container, leaving the powder in the bore through the wool previously occupied by the tube 24, to filter through the wool or leaving only the wool therein filled with the medicament. The medicament may be in either powder or liquid form.

The filler end of the container 15 is then sealed by the insertion of the stopper or plug 16, whereupon the inhaler is ready for immediate application by following such directions as these printed on the inhaler:

Remove casing from inhaler and insert in nostril, inhaling from one to four times keeping nostrils closed. Do not use more than eight times during each 24 hour period. The deepness of inhaling depends on each individual.

The benefits and advantages claimed are, the inhaler is small and easily carried in pocket or purse and use of the content by inhaling is efficacious, in the treatment of sinus, hay fever and other nasal discomforts and infections, is superior to nose packs and irrigation by use of nose drops, and it relieves hacking coughs, etc.

Suitable dimensions of the inhaler are approximately 3½ inches over all length of the assembled device, ⅝ inch outside diameter of the container 15 and ¾ inch outside diameter of the casing 10.

When not in use the parts are assembled as in Figures 1 or 3 with the container 15 filled with the medicine, sealed at the filler end by plug 16 and at its apex by the small wart or teat 13, and the container 15 screwed into the casing 10, the head 20 closing the casing opening. No escape of gas is thus possible since the vents 19 open only into the space 23 which has thus also been sealed.

It is to be understood that the invention as here disclosed is not limited to the details here described and shown but that the same may be varied without departing from the spirit of the invention as defined by the subjoined claims.

I claim:

1. A method of injecting and sealing a medicament in a container, which consists in first wrapping tightly an absorbent material around a tube, then inserting the thus wrapped tube in said container, then filling said tube with the medicament and withdrawing the tube, leaving the medicament in said material and finally sealing both inlet and outlet ends of the container.

2. A method of injecting and sealing a medicament in a container, which consists in first wrapping tightly lamb's wool around a tube, then inserting the thus wrapped tube in said container, then filling the tube with the medicament while wrapped by the lamb's wool and positioned in the container in spaced relation to the lower end thereof and withdrawing the tube, leaving the lamb's wool filled with the powdered medicament in said container and finally sealing both inlet and outlet ends of the container.

3. A method of injecting and sealing a powdered medicament in a container, which consists in first wrapping tightly lamb's wool around a tube, then inserting the thus wrapped tube in said container, and packing it down therein, then filling said tube with the medicament and withdrawing the tube, leaving the filled lamb's wool in said container and the medicament in the bore in the wool previously occupied by the tube and formed by withdrawing the tube, to filter through the wool and finally sealing both inlet and outlet ends of the container.

4. A method of injecting and sealing a medicament in a container, which consists in first wrapping tightly lamb's wool around a tube, then inserting the thus wrapped tube in said container, and packing it down therein, then filtering and soaking said wool with the medicament through the tube and withdrawing the tube, leaving the soaked lamb's wool in said container and the medicament in the bore in the wool previously occupied by the tube and formed by withdrawing the tube, to filter through the wool and finally sealing both inlet and outlet ends of the container, by means of a plug at its inlet end and screwing in the container into a forwardly closed outer casing.

5. A method of injecting and sealing a medicament in a container having an inlet end and an outlet end, which consists in first wrapping tightly an absorbent material around the stem of a funnel, then inserting the thus wrapped stem in said container to a point spaced from the bottom outlet end thereof, then filling said funnel and stem with the medicament and withdrawing the funnel leaving the medicament in the material.

6. A method of injecting and sealing a medicament in a container having an inlet end and an outlet end, which consists in first wrapping tightly an absorbent material around the stem of a funnel, then inserting the thus wrapped stem in said container to a point spaced from the bottom outlet end thereof, then filling said funnel and stem with the medicament and withdrawing the funnel leaving the medicament in the material and finally sealing both inlet and outlet ends of the container.

7. A method of injecting and sealing a powdered medicament in a container having a large open inlet end and a small opening at its outlet end, which consists in first wrapping tightly an absorbent material around a tube, then inserting the thus wrapped tube in said container to a point spaced from the outlet end thereof, then filling said tube with the powdered medicament withdrawing the tube, to cause discharge of the medicament therefrom into the material, leaving the medicament in the space in the material previously occupied by said tube and the material in the container, and finally sealing both inlet and outlet ends of the container.

GLEN TEEPLE DAVISSON.

REFERENCES CITED

The following references are of record in the file of this patent:

UNITED STATES PATENTS

| Number | Name | Date |
| --- | --- | --- |
| 795,866 | Spanogle | Aug. 1, 1905 |
| 928,884 | Randall | July 20, 1909 |
| 1,112,312 | Oliva | Sept. 29, 1914 |
| 1,470,124 | Stricker | Oct. 9, 1923 |
| 1,923,650 | Westerfield | Aug. 22, 1933 |